Oct. 10, 1939.  R. CHILTON  2,175,876

ONE-WAY CLUTCH

Filed May 15, 1937  2 Sheets-Sheet 1

INVENTOR.
ROLAND CHILTON
BY
ATTORNEY.

Oct. 10, 1939. R. CHILTON 2,175,876
ONE-WAY CLUTCH
Filed May 15, 1937 2 Sheets—Sheet 2

INVENTOR.
ROLAND CHILTON
BY
ATTORNEY.

Patented Oct. 10, 1939

2,175,876

UNITED STATES PATENT OFFICE 2,175,876

ONE-WAY CLUTCH

Roland Chilton, Ridgewood, N. J., assignor, by mesne assignments, to Wright Aeronautical Corporation, Paterson, N. J., a corporation of New York Application May 15, 1937, Serial No. 142,753

7 Claims. (Cl. 192—45)

This invention comprises improvements in one-way clutches, an embodiment showing the invention applied to an otherwise conventional roller type clutch being illustrated in the drawings.

In this well known type of clutch, a driving and driven member comprise respectively smooth and cam-form track surfaces with which rollers cooperate to automatically lock the members against relative rotation in one direction only. This is achieved through a wedging action which requires a small angle or rise in the cam member which results in the contact load between the rollers and the engaged members being very high with respect to the torque transmitted. These jamming roller loads rigidly determine the alignment between the two members when under driving effort and if any extraneous force should be present tending to produce misalignment, the resulting motion is taken at the contact between the rollers and the cam and ring members, and even though such motion has very slight amplitude, it has been found to produce local wear or scuffing of the cam surfaces which, if continued, will ultimately so modify the slight cam angle (on which the action of the clutch depends) as to cause slippage. Accordingly, a prime object of this invention is to provide simple means whereby the alignment of the parts may be that dictated by the roller engagement and whereby any extraneous misalignment is compensated so as to prevent the possibility of sliding or working at the roller contacts during driving operation. Other objects and advantages will be pointed out in the following description with reference to the drawings, in which:

These drawings show the environment of a roller clutch on which extensive development work has been done in connection with aircraft engine two-speed supercharger drives of the type shown in Patent No. 2,034,087.

Figure 1:
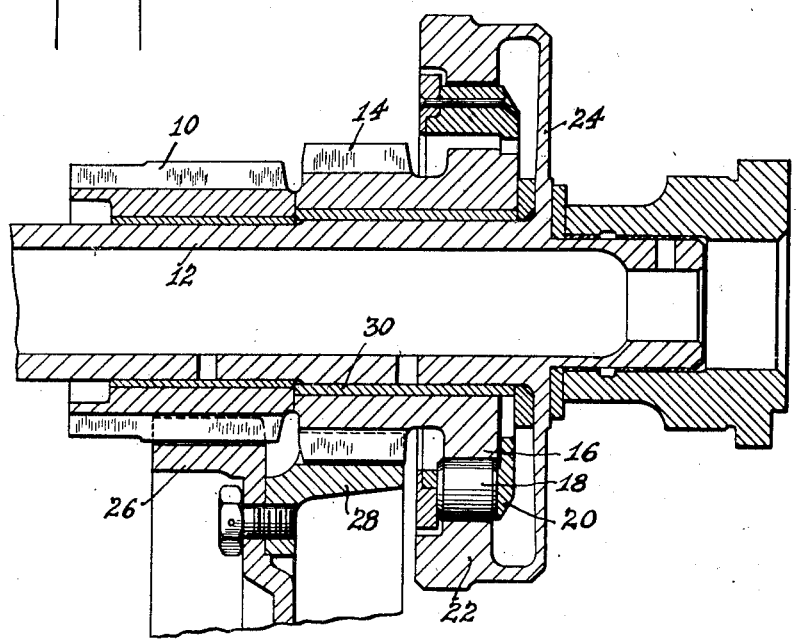
Fig. 1 is an axial fragmentary section.

In the embodiment of Fig. 1, a pinion 10 engages a driving gear (not shown) and is mounted for free rotation on a shaft 12 as is also a clutch pinion 14 which is equipped with a conventional cam 16 engaged by rollers 18, spaced by a cage 20 and engaging a ring or internal track 22, shown as integral with the shaft 12 through a back plate or disc 24. The pinions 10 and 14 are connected by back gears indicated in fragmentary section at 26—28. Except for the proportions of the element 24, the parts so far described represent an existing conventional structure.

Figure 2:
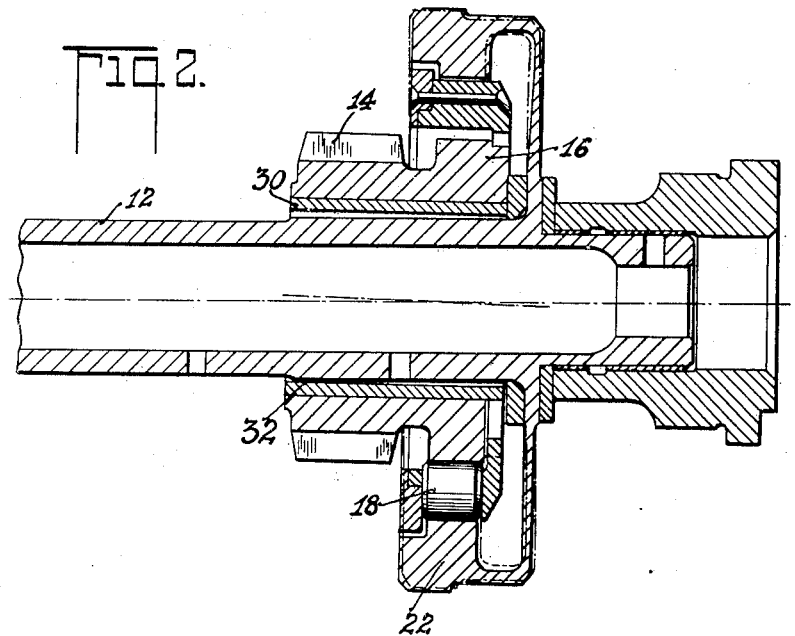
Fig. 2 is a similar section with one possible source of misalignment illustrated to exaggerated scale.

The pinion and cam hub member 14—16 is provided with a bushing 30 rotatably free on the shaft 12 wherefore a certain running clearance must necessarily be provided in this bearing. Fig. 2 shows in exaggerated form the result of this clearance as follows: When the clutch is engaged, the very high loads on the rollers center the cam 16 so that this end of the bushing clears the shaft all around. However, the pinion 14 at the other end of the member 14—16 is subject to tooth loads from the engaged gear 28 which forces this end of the bushing into contact with the shaft as illustrated at 32. The result is that the gear and cam hub element 14—16 is urged to run at a slight angle to the shaft 12, with which the ring 22 was originally made rigid by the roller engagement. Unfortunately, due to the fact that the pinion 14 and shaft 12 are rotating, the location of the zero clearance point 32 rotates relative to the shaft so that the cam 16 has a slight relative gyratory motion, which motion sets up slight movement between the rollers and the contacted parts which, after protracted running, cause the rollers to chafe slight depressions in the cam member and, when such depressions are wide enough to subtend a few degrees of arc around the roller, slippage of the clutch results because the designed angle of the cam has, by this wear, been increased at the actual roller contact.

This has been a common source of trouble with roller clutches but it has been previously attributed to overloading or insufficient capacity in the rollers. In the development referred to, it was demonstrated that the difficulty was due to the minute but rapid motion from misalignment. In the original clutch, the disc member 24 uniting the driven ring 22 with the shaft 12 was made of conventional thickness (about three times that indicated) and it was found that, as long as the bearing clearance of the bushing 30 could be kept down to .001 of an inch, the clutch cam would show no scuffing but, when a more normal clearance of .003 was tried, depressions soon occurred at the roller contacts on the cam. In practice, it is difficult and undesirable to maintain the clearance at such a small figure as .001 inch and accordingly, the expedient of thinning up the back plate 24 to the abnormally thin proportions was tried. This thin disc has substantial lateral flexibility, sufficient to permit the ring 22 to follow a slightly gyratory path so that these members rotate without any relative "wobbling" so that relative motion at the roller contacts is avoided.

In this specific embodiment, the flexible universal connection has been shown as between the ring 22 and the shaft 12 and to comprise a flexible element integral with these parts.

Figure 3:
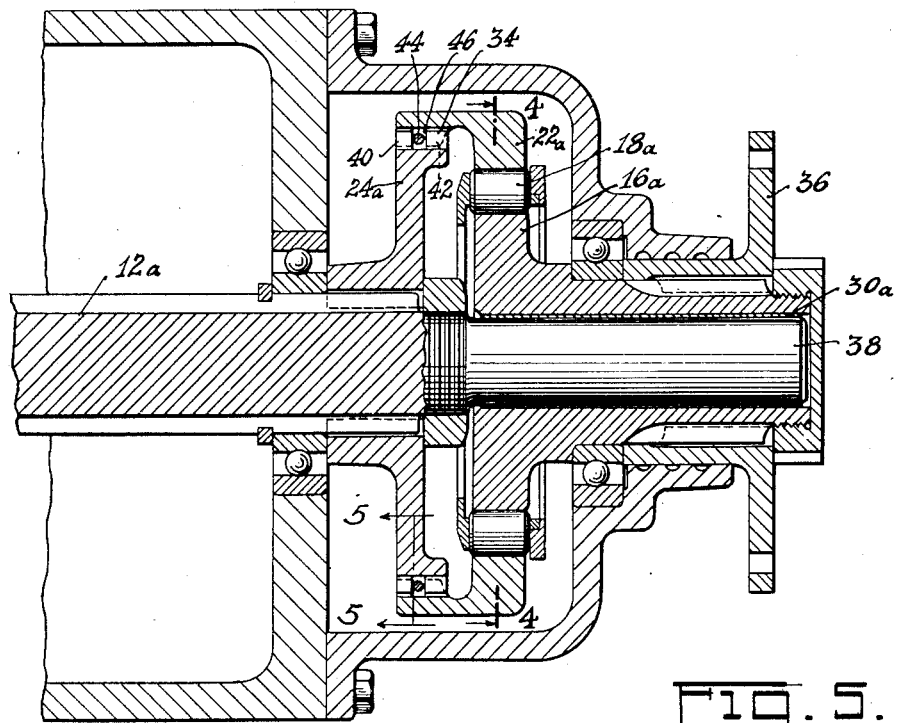
Fig. 3 is an axial section of a slightly modified form of the invention.
Figure 4:
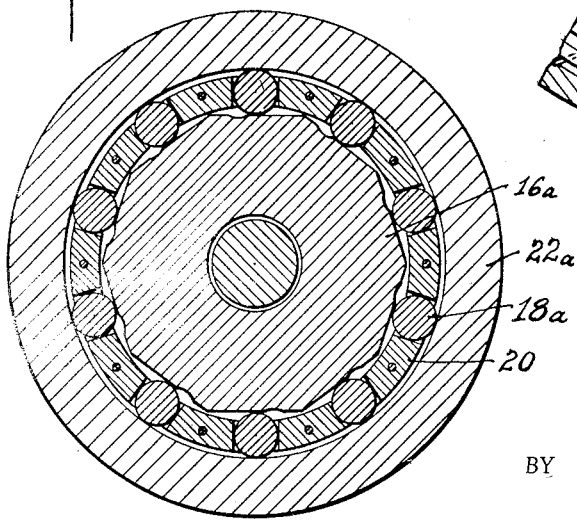
Fig. 4 is a cross-section on the line 4—4 of Fig. 3, illustrating the conventional roller clutch elements forming part of the assembly of the invention.
Figure 5:
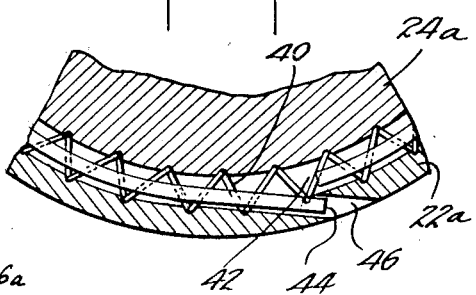
Fig. 5 is a fragmentary section on the line 5—5 of Fig. 3.

In Fig. 3, there is shown an embodiment of the invention suitable for an automobile free-wheel, the entire structure being conventional except that the outer ring 22a is secured to the shaft 12a by a loose splined joint 34—24a, permitting slight axial motion whereby the ring 22a may follow the cam 16a. In this embodiment, a conventional universal joint and propeller shaft will be attached to the usual flange 36 and the weight of these parts will cause the right hand end of the bushing 30a to be in contact always at the top of the shaft pilot 38, whereas the cam end of this bushing 30a will be held central by the rollers when the clutch is engaged, producing slight misalignment as discussed in connection with Fig. 2. Here, again, as the parts are rotated, the result is a relative gyratory motion which is taken at the spline connection 34 thereby eliminating relative motion at the rollers, so preventing the scuffing and wear thereat. Said spline connection comprises inter-engaging teeth 40 and 42, respectively, integral with the elements 24a and 22a, the splines being held in proper axial position by a lock wire 44 extending circumferentially in a slot 46 formed by interrupting the teeth 40 and 42 intermediate their length, the wire being inserted through a tangential hole 46 formed in the member 22a.

While I have described my invention in detail in its present preferred embodiments; it will be obvious to those skilled in the art, after understanding my invention, that various changes and modifications may be made therein without departing from the spirit or scope thereof. I aim in the appended claims to cover all such modifications and changes.

I claim as my invention:

1. In combination, a shaft, a member including a bearing having a running clearance upon said shaft, a cam on said member, rollers engaging said cam, a ring engaging said rollers, and torsionally rigid means drivably connecting said ring and shaft and having slight lateral yield whereby the ring and cam member may rotate about a common axis notwithstanding that such axis becomes misaligned with the shaft axis on account of said bearing clearance.

2. In a one-way clutch comprising cam and ring members and rollers therebetween, drive means for said members producing eccentric loading thereon whereby misalignment of the members is urged during operation, and a torsional rigid laterally flexible element connecting one said member with a corresponding drive means adapted to absorb the misalignment as it occurs.

3. In combination, a cam member including a hub, an embracing ring member including a hub and a laterally yieldable integral web joining the ring and its hub, and rollers providing a one-way driving connection between said cam member and said ring member.

4. In combination, a cam member including a hub, an embracing ring member including a hub and a laterally yieldable integral web joining the ring and its hub, rollers providing a one-way driving connection between said cam member and said ring member, and a shaft to which one said hub is fixed and on which the other said hub is journaled.

5. In combination, a shaft having an integral flexible annular web extending therefrom, a ring integral with said web and having an internal circular track, a cam member, including a driving connection, journaled on said shaft, the cam member being embraced by the ring, and rollers providing a one-way driving connection between said cam and ring.

6. In combination, a rotatable cam member, an embracing ring member, rollers providing a one-way driving connection between said cam and ring members, and a hub having a loose spline driving connection with said ring, said connection providing for a positive drive between the ring and hub but by its looseness permitting the ring to run in alinement with the cam and out of alinement with the hub.

7. In combination, a shaft having a hub secured thereto, a ring loosely splined to the hub for positive driving relation therewith but free for slight misalinement due to the spline looseness, a cam journaled on said shaft, and rollers providing a one-way driving connection between said cam and ring.

ROLAND CHILTON.